(12) United States Patent
Yin

(10) Patent No.: US 6,614,965 B2
(45) Date of Patent: Sep. 2, 2003

(54) EFFICIENT COUPLING OF OPTICAL FIBER TO OPTICAL COMPONENT

(75) Inventor: Xiaoming Yin, Pasadena, CA (US)

(73) Assignee: Lightcross, Inc.

( * ) Notice: Subject to any disclaimer, the term of this patent is extended or adjusted under 35 U.S.C. 154(b) by 0 days.

(21) Appl. No.: 09/854,425

(22) Filed: May 11, 2001

(65) Prior Publication Data
US 2002/0168145 A1 Nov. 14, 2002

(51) Int. Cl.⁷ .................................................. G02B 6/30
(52) U.S. Cl. ......................................................... 385/49
(58) Field of Search ............................. 385/48, 49, 50, 385/51, 18, 31, 33

(56) References Cited

U.S. PATENT DOCUMENTS

| 4,618,210 A | 10/1986 | Kondo |
| 4,744,619 A | 5/1988 | Cameron |
| 4,747,654 A | 5/1988 | Yi-Yan |
| 4,772,086 A | 9/1988 | Bellerby et al. |
| 4,813,757 A | 3/1989 | Sakano et al. |
| 4,836,645 A | 6/1989 | Lefevre et al. |
| 4,846,542 A | 7/1989 | Okayama |
| 4,948,219 A | 8/1990 | Seino et al. |
| 5,002,350 A | 3/1991 | Dragone |
| 5,013,113 A | 5/1991 | Soref |
| 5,039,993 A | 8/1991 | Dragone |
| 5,073,002 A | 12/1991 | Hockaday |
| 5,243,672 A | 9/1993 | Dragone |
| 5,278,926 A | 1/1994 | Doussiere |
| 5,337,380 A | 8/1994 | Darbon et al. |
| 5,347,601 A | 9/1994 | Ade et al. |
| 5,402,511 A | 3/1995 | Malone et al. |
| 5,410,623 A | 4/1995 | Minami et al. |
| 5,412,744 A | 5/1995 | Dragone |
| 5,436,919 A * | 7/1995 | Chwalek et al. ............... 372/23 |
| 5,444,805 A | 8/1995 | Mayer |
| 5,450,511 A | 9/1995 | Dragone |
| 5,467,418 A | 11/1995 | Dragone |
| 5,481,632 A | 1/1996 | Hirai et al. |
| 5,581,643 A | 12/1996 | Wu |
| 5,625,730 A | 4/1997 | Ishikawa et al. |
| 5,652,813 A * | 7/1997 | Wilson ........................ 385/24 |

(List continued on next page.)

FOREIGN PATENT DOCUMENTS

| EP | 0647861 A1 | 4/1995 |
| EP | 0985942 A2 | 3/2000 |
| JP | 63-197923 | 8/1988 |
| JP | 2-179621 | 7/1990 |
| JP | 404358105 A | 12/1992 |
| JP | 405210026 A | 8/1993 |
| JP | 6-186598 | 7/1994 |

OTHER PUBLICATIONS

Abe et al., Optical Path Length Technique using Thin Film Heaters for Silica–Based Waveguides on Si, Electronics Letters, Sep. 12, 1996, vol. 32–No. 19, pp. 1818–1820.

Albert, J., Planar Fresnel Lens Photoimprinted in a Germanium–Doped Silica Optical Waveguide, Optics Letters, May 15, 1995, vol. 20–No. 10, pp. 1136–1138.

(List continued on next page.)

Primary Examiner—Tulsidas Patel
(74) Attorney, Agent, or Firm—Law Offices of Travis L. Dodd

(57) ABSTRACT

A method of preparing an optical component for coupling with an optical fiber is disclosed. The method includes determining a thickness of a buffer layer formed on the optical component. The method also includes forming an anti reflective coating adjacent to the buffer layer. The anti reflective coating is formed to a thickness selected in response to the determined buffer layer thickness.

37 Claims, 5 Drawing Sheets

U.S. PATENT DOCUMENTS

| | | |
|---|---|---|
| 5,706,377 A | 1/1998 | Li |
| 5,787,214 A | 7/1998 | Harpin et al. .................. 385/49 |
| 5,796,900 A | 8/1998 | Degani et al. |
| 5,841,931 A | 11/1998 | Foresi et al. |
| 5,938,811 A | 8/1999 | Greene |
| 6,075,914 A | 6/2000 | Yeandle ........................ 385/49 |
| 6,078,711 A | 6/2000 | Yeandle et al. ............... 385/49 |
| 6,108,478 A | 8/2000 | Harpon et al. |
| 6,118,909 A | 9/2000 | Chen et al. |
| 6,212,320 B1 | 4/2001 | Rickman et al. .............. 385/49 |
| 6,220,766 B1 | 4/2001 | Yeandle et al. ............... 385/94 |
| 6,231,771 B1 | 5/2001 | Drake .......................... 216/24 |
| 6,243,518 B1 | 6/2001 | Lee et al. |
| 6,312,165 B1 | 11/2001 | Yeandle et al. ............... 385/88 |
| 6,431,766 B1 | 8/2002 | Randle ........................ 385/92 |
| 6,438,297 B1 | 8/2002 | McKenzie ................... 385/49 |
| 2002/0131715 A1 | 9/2002 | Brady .......................... 385/51 |
| 2002/0168168 A1 | 11/2002 | Iravani ....................... 385/136 |
| 2002/0197015 A1 | 12/2002 | Shaw .......................... 385/49 |
| 2003/0002801 A1 | 1/2003 | Vegny et al. ................. 385/52 |
| 2003/0012508 A1 | 1/2003 | Westmarland et al. ........ 385/49 |

OTHER PUBLICATIONS

Aman, M.C., Calculation of Metal–Clad Ridge–Waveguide (MCRW) Laser Modes by Mode Coupling Technique, Journal of Lightwave Technology, vol. Lt–4, No. 6, Jun. 1986, p. 689–693.

Amann, M.C. et al., Calculation Of The Effective Refractive–Index Step For The Metal–Cladded–Ridge–Waveguide Laser, Applied Optics, vol. 02, No. 8, Apr. 15, 1981, p. 1483–1486.

Baba, S. et al., A Novel Integrated–Twin–Guide (ITG) Optical Switch with a Built–in TIR Region; IEEE Photonics Technology Letters, vol. 4, No. 5, May 1992, p. 486–488.

Benson, T.M., Etched–Wall Bent–Guide Structure for Integrated Optics in the III–V Semiconductors; Journal of Lightwave Technology, vol. Lt–2, No. 1, Feb. 1984; p. 31–34.

Perry, G.M. et al., Analysis Of Multiplayer Semiconductor Rib Waveguides With High Refractive Index Substrates, Electronics Letters, vol. 29, No. 22; Oct. 28, 1993, p. 1941–1942.

Betty, I. et al., A Robust, Low–Crosstalk, InGaAsP/InP Total–Internal–Reflection Switch For Optical Cross–Connect Application.

Burke, S.V., Spectral Index Method Applied to Coupled Rib Waveguides; Electronics Letters, vol. 25, No. 9, Apr. 27, 1989, p. 605–606.

Burns, W.K. et al., Mode Conversion in Planar–Dielectric Separating Waveguides; IEEE Journal of Quantum Electronics, vol. QE–11, No. 1, Jan. 1975; p. 32–39.

Cai, Y. et al., A Novel Three–Guide Optical Coupler Using A Taper–Formed Waveguide; j. Appl. Phys 69(5), Mar. 1991; p. 2810–2814.

Cavailles, J.A. et al., First Digital Optical Switch Based on InP/GaInAsP Double Heterostructure Waveguides; Electronics Letters, vol. 27, No. 9, Apr. 25, 1991, p. 699–700.

Chen, R.T. et al., Design and Manufacturing of WDM Devices; Proceedings of SPIE vol. 3234.

Clemens, et al., Waveguide–Adaptable Optical Phased Array in $SiO_2$–Si, Photonics Technology Letters, Oct. 1995, vol. 7–No. 10, 1040–1041.

Dagli, N. et al., Analysis of Rib Dielectric Waveguides, IEEE Journal of Quantum Electronics, vol. QE–21, No. 4, Apr. 1985, p. 315–321.

Dagli, N. et al., Theoretical and Experimental Study of the Analysis and Modeling of Integrated Optical Components; IEEE Journal of Quantum electroniics, vol. 24, No. 11, Nov. 1988; p. 2215–2226.

Deri, R.J., et al., Low–Loss GaAs/AlGaAs Waveguide Phase Modulator Using A W–Shaped Index Profile; Sep. 6, 1988.

Deri, R.J. et al., Low–Loss Multiple Quantum Well GaInAs/InP Optical Waveguides; Feb. 21, 1989.

DeVaux, F. et al., 20Gbit/s Operation of a High–Efficiency InGaAsP/InGaAsP MQW Electroabsorption Modulator With 1.2–V Drive Voltage; IEEE Photonics Technology Letters, vol. 5, No. 11, Nov. 1993, p. 1288–1290.

Doerr, C.R. et al., Chirping Of The Waveguide Grating Router For Free–Spectral–Range Mode Selection In The Multifrequency Laser, IEEE Photonics Technology Letters, Apr. 1996, vol. 8–No. 4, pp. 500–502.

Doerr, C.R. et al., Chromatic Focal lane Displacement in the Parabolic Chirped Waveguide Grating Router, May 1995, vol. 9–No. 5, pp. 625–627.

Dragone, c. Efficient NxN Star Couplers Using Fourier Optics, pp. 479–448, Mar. 1989, vol. 7–No. 3, Journal of Lightwave Technology.

Fischer, et al., Singlemode Optical Switches Based on SOI Waveguides with Large Cross–Section, Electronics Letters, Mar. 3, 1994, vol. 30–No. 5, pp. 406–408.

Fischer, K. et al., Sensor Application Of SiON Integrated Optical Waveguides On Silicon; Elevier Sequoia, 1992; p. 209–213.

Fish, G. et al., Monolithic InP Optical Crossconnects: 4×4 and Beyond, JWB2–1, p. 19–21.

Furuta, H. et al, Novel Optical Waveguide For Integrated Optics, Applied Optics, vol. 13, No. 2, Feb. 1974, p. 322–326.

Gini, E. et al., Low Loss Self–Aligned Optical Waveguide Corner Mirrors in InGaAsP/InP, We P2.22.

Goel, K. et al Design Considerations for Low Switching Voltage Crossing Channel Switches; Journal of Lightwave Technology, vol. 6, No. 6, Jun. 1988; p. 881–886.

Granestrand, P. et al., Integrated Optics 4×4 Switch Matrix with Digital Switches: Electronics Letters, vol. 26, No. 1, Jan. 4, 1990; p. 4–5.

Himeno, A. et al., Loss Measurement and Analysis of High–Silica Reflection Bending Optical Waveguides, Journal of Lightwave Technology, Jan. 1988, vol. 6–No. 1, 41–46.

Hsu, K.Y. et al., Photonics devices and Modules, www.c-c.nctu.ed.tw/~ctr/lee_mti/research_devices_modules.htm, pp. 1–3.

Huang, T.C. et al., Depletion Edge Translation Waveguide Crossing Optical Switch; IEEE Photonics Technology Letters, vol. 1, No. 7, Jul. 1989, p. 168–170.

Hutcheson, L.D. et al., Comparison of Bending Losses in Integrated Optical Circuits; Optics Letters, vol. 5, No. 6, Jun. 1980, p. 360–362.

Inoue, H. et al, Low Loss GaAs Optical Waveguides, Journal of Lightwave Technology, vol. LT–3, No. 6, Dec. 1985; p. 204–209.

Irace, A. et al., Fast Silicon–on–Silicon Optoelectronic Router Based on a BMFET Device, Journal of Selected Topics in Quantum Electronics, Jan./Feb. 2000, vol. 6–No. 1, pp. 14–18.

Ito, F. et al., Carrier–Injection–Type Optical Switch In GaAs With A 1.06–1.55 µm Wavelength Range; Appl. Physics Letters, 54(2) Jan. 9, 1989; p. 134–136.

Jackman, N. et al., Optical Cross Connects for Optical Networking: Bell Labs Technical Journal, Jan.–Mar. 1999; p. 262–281.

Johnston, I.R., et al., Silicon–Based Fabrication Process For Production Of Optical Waveguides; IEE Proc–Optoelectron., vol. 143, No. 1, Feb. 1996, p. 37–40.

Kaenko, A. et al., Athermal Silica–based Arrayed–waveguide Grating (AWG) Multiplexers with New Loss Groove Design; TuO1–1, p. 204–206.

Kasahara, R. et al., Low–Power Consumption Slica–Based 2×2 Thermoptic Switch Using Trenched Silicon Substrate, IEEE Photonics Technology Letters, vol. 11, No. 9, Sep. 1999, p. 1132–1134.

Khan, M.N. et al., Fabrication–Tolerant, Low–Loss, and High–Speed Digital Optical Switches in InGaAsP/InP Quantum Wells; Proc $21^{st}$ Eur.Conf.on Opt.Comm.(ECOC '95–Brussels), p. 103–106.

Khan, M.N. et al., High–Speed Operation of Quantum Well Electron Transfer Optical Switches; p. 102–102c.

Kirihara, T. et al., Lossless And Low Crosstalk 4×4 Optical Switch Array; Electronics And Communications in Japan; Part 2, vol. 77, No. 11, 1994, p. 73–81.

Kirihara, T. et al., Lossless and Low–Crosstalk Characteristics in an InP–Based 2×2 Optical Switch, IEEE Photonics Technology Letters, vol. 5, No. 9 Sep. 1993, p. 1059–1061.

Kokubun, Y. et al., Athermal Waveguides for Temperature–Indepent Lightwave Devices, Nov. 1993, 1297–1298, vol. 5–No. 11, IEEE Photonics Technology Letters.

Kokubun, Y. et al., Temperature–Independent Narrowband Optical Filter at 1.3 µm Wavelength by an Athermal Waveguide, $10^{th}$ Oct. 1996, vol. 32–No. 21, Electronics Letters.

Kokubun, Y. et al., Temperature–Independent Optical Filter at 1.55 µm Waveguide Using a Silica–Based Athermal Waveguide, Feb. 19, 1998, vol. 34–No. 4, Electronics Letters.

Kokubun, Y. et al., Three–Dimensional Athermal Waveguides for Temperature Independent Lightwave Devices, Jul. $21^{st}$, 1994, vol. 30–No. 15, Electronics Letters.

Kostrzewa, C. et al., Tunable Polymer Optical Add/Drop Filter for Multiwavelength Networks, Photonics Technology Letters, Nov. 1997, vol. 9–No. 11, 1487–1489.

Laakman, K.D. et al., Waveguides: Characteristics Modes Of Hollow Rectangular Dielectric Waveguides; Applied Optics, vol. 15, No. 5, May 1976; pp. 1334–1340.

Lee, T.P. et al., $Al_xGa_{1-x}As$ Double–Heterostructure Rib–Waveguide Injection Laser; IEEE Journal of Quantum Electronics, vol. QE–11, No. 7, Jul. 1975; p. 432–435.

Liu, Y.L. et al., Silicon 1×x Digital Optical Switch Plasma Dispersion; Electronics Letters, vol. 30, No. 2, Jan. 20, 1994; p. 130–131.

Mak, G. et al., High–Speed Bulk InGaAsP–InP Electroabsorption Modulators with Bandwidth in Excess of 20 GHz, IEEE Photonics Technology Letter, vol. 2, No. 10, Oct. 1990, p. 730–733.

Marcatili, E., Improved Coupled–Mode Equations for Dielectric Guides; IEEE Journal of Quantum Electronics, vol. QE–22, No. 6, Jun. 1986; p. 988–993.

Marcatili, E.A.J., Dielectric Rectangular Waveguide and Directional Coupler for Integrated Optics. The Bell System Technical Journal, Sep. 1969 p. 2071–2101.

Marcatili, E.A.J., Slab–Coupled Waveguides; The Bell System Technical Journal, Apr. 1974; American Telephone & Telegraph Company, vol. 53, No. 4, Apr. 1974.

Mirza, A.R. et al., Silicon Wafer Bonding for MEMS Manufacturing, Solid State Technology, Aug. 1999, p. 73–78.

Moerman, I. et al., A Review on Fabrication Technologies for the Monolithic Integration of Tapers with III–V Semiconductors Devices; IEEE Journal of Selected Topics in Quantum electronics, vol. 3, No. 6, Dec. 1997, p. 1308–1320.

Müller, G. et al., First Low Loss InP/InGaAsP with Integrated Mode Transformers, ThC12, 10; p. 37–40.

Nayyer, J. et al., Analysis of Reflection–Type Optical Switches with Intersecting Waveguides, Journal of Lightwave Technology, vol. 6, No. 6, Jun. 1988; p. 1146–1152.

Negami, t. et al., Guided–Wave Optical Wavelength Demultiplexer Using An Asymmetric Y Junction; Appl. Phys. Lett. 54 (12), Mar. 20, 1989; p. 1080–1082.

Nelson, W. et al., Optical Switching Expands Communications–Network Capacity; Laser Focus World, Jun. 1994, p. 517–520.

Nelson, W.H. et al., Wavelength–and Polarization–Independent Large Angle InP/InGaAsP Digital Optical Switches with Extinction Ratios Exceeding 20 dB; IEEE Photonics Technology Letters, vol. 6, No. 11, Nov. 1994; p. 1332–1334.

Noda, Y. et al., High–Speed Electroabsorption Modulator with Strip–Loaded GaInAsP Planar Waveguide; Journal of Lightwave Technology, vol. LT–4, No. 10, Oct. 1986, p. 145–1453.

Offrein, B.J. et al., Resonant Coupler–Based Tunable Add–After–Drop Filter in Silicon–Oxynitride Technology for WDM Networks, Journal of Selected Topics in Quantum Electronics, vol. 5–No. 5, 1400–1405.

Okamoto, K. et al., Arrayed–Waveguide Grating Multiplexer With Flat Spectral Response; Optics Letters, Jan. 1, 1995; vol. 20, No. 1; pp. 43–45.

Okamoto, K. et al., Flay Spectreal Response Arrayed–Waveguide Grating Multiplexer with Parabolic Waveguide Horns, Electronics Letters Online, Jul. 15, 1996, No. 19961120, pp. 1661–1662.

Okayama, H. et al., Dynamic Wavelength Selective Add/Drop Node Comprising Tunable Gratings, Electronics Letters Online, Apr. 10, 1997, No. 19970607.

Okayama, H. et al., Reduction of Voltage–Length Product for Y–Branch Digital Optical Switch, Journal of Lightwave Technology, vol. 11, No. 2, Feb. 1993; p. 379–387.

Okuno, M. et al., Strictly Nonblocking 16×16 Matrix Switch Using Silica Based Planar Lightwave Circuits, vol. 10, No. 266, Sep. 11, 1986.

Ooba, N. et al., Athermal Silica–Based Arrayed–Waveguide Grating Multiplexer Using Bimetal Plate Temperature Compensator, Electronics Letters, Oct. $12^{th,}$ 2000, vol. 36, No. 21, pp. 1800–1801.

Renaud, M. et al., Compact Digital Optical Switches for Low Insertion Loss Large Switch Arrays on InP; Proc. $21^{st}$ Eur. Conf.on Opt. Comm. (ECOC '95–Brussels), p. 99–102.

Rickman, A.G. et al., Silicon–on–Insulator Optical Rib Waveguide Loss and Mode Characteristics, Journal of Lightwave Technology, Oct. 1994, vol. 12–No. 10, pp. 1771–1776.

Rolland, C. et al., 10 Gbit/s, 1.56 µm, Multiquantum Well InP/InGaAsP Mach–Zehnder Optical Modulator, Electronics Letters, Mar. 4, 1993, vol. 29, No. 5, p. 471–472.

Santec Sales Brochure for year 2000 entitled "Optical Components".

Schauwecker, B. et al., Small–Size Silicon–Oxynitride AWG Demultiplexer Around 725 nm, IEEE Photonics Technology Letters, vol. 12 No. 12, Dec. 2000.

Schlachetzki, A. Monolithic IO–Technology–Modulators and Switches Based on InP; SPIE vol. 651 Integrated Optical Circuit Engineering III (1986), p. 60–86.

Silberberg, Y. et al., Digital Optical Switch, Appl. Phys. Lett; vol. 51, No. 16, Oct. 19, 1987, p. 152–154.

Smit, M.K., New Focusing and Dispersive Planar Component Based on an Optical Phased Array; Electronics Letters, Mar. 31, 1988; vol. 24, No. 7; p. 385–386.

Smith, S.D. et al., CW Operation of Corner Cavity Semiconductor Lasers; IEEE Photonics Technology Letters, vol. 5, No. 8, Aug. 1993; p. 876–879.

Sneh, A. et al., Compact Low Crosstalk and Low Propagation Loss Quantum–Well Y–Branch Switches; PDP 4–1~4–5.

Soole, J.B.D. et al., Use of Multimode Interference Couplers to Broaden the Passband of Wavelength–Dispersive Integrated WDM Filters; IEEE Photonics Technology Letters, vol. 8, No. 10, Oct. 1996; p. 1340–1342.

Stoll, L. et al., 1:8 Optical Matrix Switch on InP/InGaAsP with Integrated Mode Transformers; Optical Switches and Modulators II, p. 531–534.

Stoll, L. et al., Compact and Polarization Independent Optical Switch on InP/InGaAsP; TuB7.2; p. 337–340.

Stutius, W. et al, Silicon Nitride Films On Silicon For Optical Waveguides, Applied Optics, vol. 16, No. 12, Dec. 1977, p. 303–307.

Sugie, T. et al., 1.3–$\mu$m Laser Diodes with a Butt–jointed Selectively Grown Spot–Size Converter, ThB2–6, IOOC95, p. 52–53.

Tada, K. et al., Bipolar Transistor Carrier–Injected Optical Modulator/Switch: Proposal and Analysis, IEEE Electron Device Letters, vol. EDL–7, No. 11, Nov. 1986, p. 605–606.

Takada, et al., Optical Spectrum analyzer using Cascaded AWG's with Different Channel Spacings, Photonics Technology Letters, Jul. 1999, vol. 11, No. 7, pp. 863–864.

Takahashi, H. et al., Arrayed Waveguide Gratings for Wavelength Division Multi/Demultilexer with Nanometre Resolution, PWG–NTT–7.

Takaguchi, K. et al, Dispersion Compensation Using a Planar Lightwave Circuit Optical Equalizer, Photonics Technology Letters, Apr. 1994, vol. 6, No. 4, pp. 561–564.

Tien, P.K. et al., Formation of Light–Guiding Interconnections in an Integrated Optical Circuit by Composite Tapered–Film Coupling; Applied Optics, vol. 12, No. 8, Aug. 1973; p. 1909–1916.

Toyoda et al., Thermoplastic Switch and Wavelength Tunable Filter using Polymer Waveguides, Abstract of paper presented at Opticomm 2001 on Aug. 22, 2001.

Treyz, G.V. et al., Silicon Optical Modulators at 1.3 $\mu$m Based on Free–Carrier Absorption; IEEE Electron Device Letters, vol. 12, No. 6, Jun. 1991; p. 276–278.

Tsuda, H. et al., Performance Analysis of a Dispersion Compensator Using Arrayed–Waveguide Gratings, Journal of Lightwave Technology, Aug. 2000, vol. 18–No. 8, pp. 1139–1147.

Tsude, H. et al., Second–and Third–Order Dispersion Compensator Using a High–Resolution Arrayed Waveguide Grating, IEEE Photonics Technology Letters, May 1999, vol. 11–No. 5, 569–571.

Vinchant et al, InP 4×4 Digital–Optical–Switch Module For Multiwavelength Cross–Connect Applications; OFC '95 Technical Digest, Thursday TkK2, p. 281–282.

Vinchant, J.F. et al., First Polarisation insensitive 4×4 Switch matrix on InP with Digital Switches, TuB7.3, p. 341–344.

Vinchant, J.F. et al., InP Digital Optical Switch: Key Element for Guided–Wave Photonic Switching; IEE Proceedings–J, vol. 140, No. 5, Oct. 1993; p. 301–307.

Vinchant, J.F. et al., Low Driving Voltage or Current Digital Switch on InP for Multiwavelength System Applications; Electronics Letters, vol. 28, No. 12, Jun. 4, 1992; p. 1135–1137.

Wakita, K. et al., Long Wavelength Multiple Quantum Well Optical Modulators; IEEE Journal of Quantum Electronics, vol. QE–23, No. 12, Dec. 1987, p. 2210–2215.

Wanru, Z. et al., Total Internal Reflection Optical Switch with Injection Region Isolated by Oxygen for Implantation; pp. 1–10.

Yamada, et al., Cross Talk Reduction in a 10 GHz Spacing Arrayed–Waveguide Grating by Phase–Error Compensation, Journal of Lightwave Technology, Mar. 1998, vol. 16–No. 3, pp. 364–371.

Yanagawa, H. et al., Polarization–and Wavelength–Insensitive Guided–Wave Optical Switch with Semiconductor Y Junction; Journal of Lightwave Technology, vol. 8, No. 8, Aug. 1990, p. 1192–1197.

Yu, S. et al., High Speed All–Optical Packet Routing Using A Vertical Coupler Crosspoint Space Switch.

Yu, S. et al., Ultralow Cross–Talk, compact integrated optical crosspoint space switch arrays employing active InGaAsP/InP Vertical Waveguide Couplers, Integrated Optical Crosspoint Switch Arrays, Siyuan Yu et a, CPD24–2.

Zengerle, R. et al., Tapered Twin Waveguides For Spot–Size Transformation In InP; TheB2–5; IOOC 95; pp. 50–51.

Zirngibl, M. et al., Digitally Tunable Laser Based On The Integration Of A Waveguide Grating Multiplexer And An Optical Amplifier, IEEE Photonics Technology Letters, Apr. 1994, vol. 6–No. 4, pp. 516–517.

Zucker, J.E. et al., Strained Quantum Wells for Polarization–Independent Electrooptic Waveguide Switches, Journal of Lightwave Technology, vol. 10, No. 12, Dec. 1992, pp. 1926–1930.

Lin, et al., Detector Array Packaging Technology for PLCs and its Application in WDM Subsystems, 1999 IEEE, 65–68.

Moerman, I. et al., A Review on Fabrication Technologies for the Monolithic Integration of Tapers with III–V Semiconductor Devices, IEEE Journal of Selected Topics in Quantum electronics, vol. 3, No. 6, Dec. 1997, p. 1308–1320.

Pennings, et al., Integrated–Optic Versus Microscopic Device for Fiber–Optic TElecommunication Systems: A comparison, IEEE Journal of Selected Topics in Quantum Electronics, vol. 2, No. 2, Jun. 1996.

Pohl, et al., Symmetrical Field–Matching Waveguide for Low–Loss fiber–Chip Butt Coupling, J. Opt. Commun. 16 (1995) 4, 138–142.

* cited by examiner

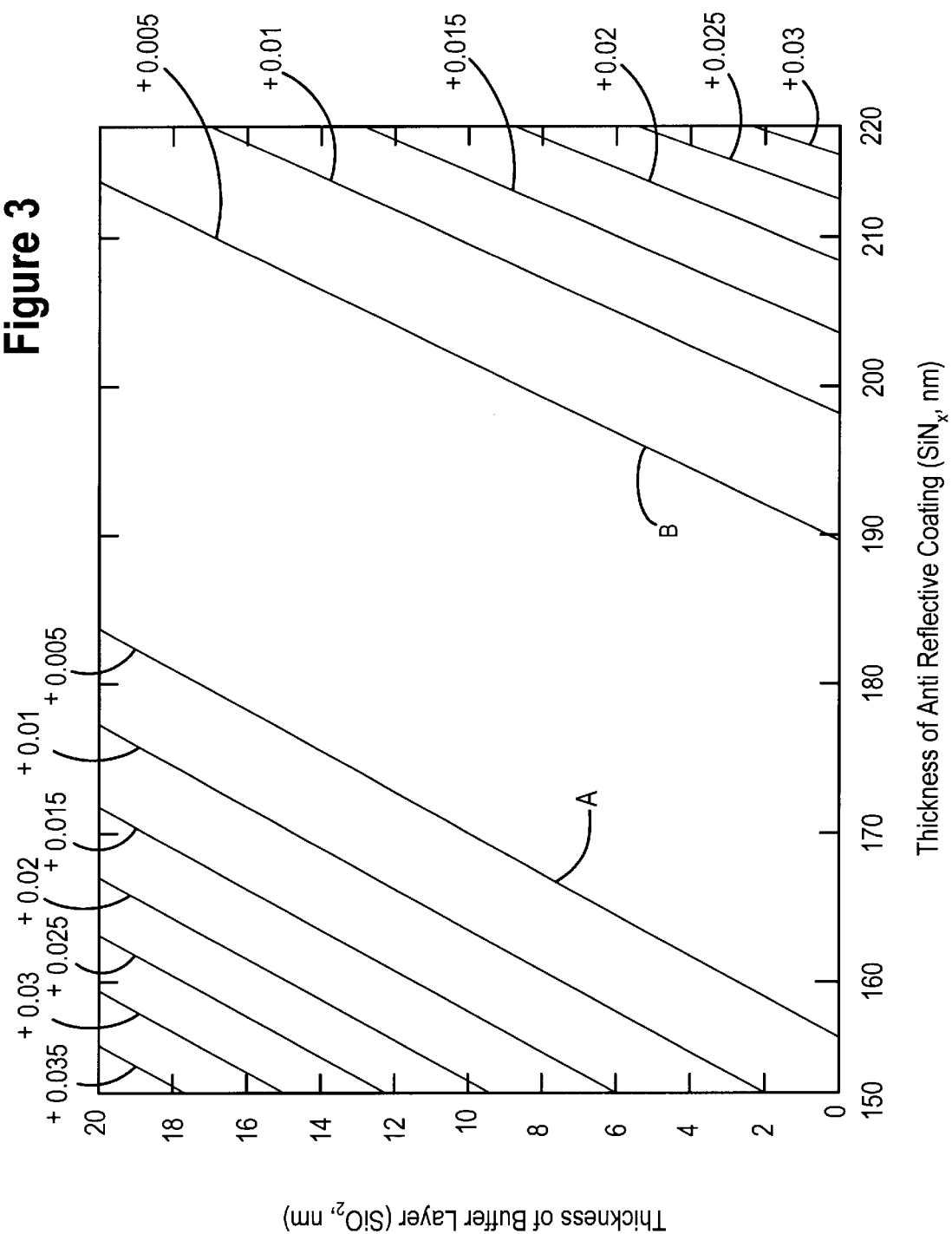

EFFICIENT COUPLING OF OPTICAL FIBER TO OPTICAL COMPONENT

BACKGROUND

1. Field of the Invention

The invention relates to coupling of optical fibers to optical networking components. In particular, the invention relates to increasing the efficiencies associated with coupling of an optical fiber and an optical component.

2. Background of the Invention

A variety of optical networking components includes one or more waveguides formed over a substrate. These waveguides are often coupled with optical fibers that carry light signals to and/or from the components. Reflection is known to occur at the intersection of an optical fiber and a waveguide. This reflection is a source of optical loss. Further, lasers are often the source of the light signal on an optical fiber. When a light signal from a laser is reflected at a component, the light signal can travel backward along the optical fiber and damage the laser.

An anti reflective coating is often positioned between the optical fiber and the component in order to reduce the level of optical loss. Anti reflective coatings are known to place stress on the waveguide. This stress can change the index of refection of the waveguide. The change in the index of refraction can reduce the quality of the component performance. Additionally, many anti reflective coatings do not adhere well to the component.

For the above reasons, there is a need for an improved method of coupling an optical fiber with an optical component.

SUMMARY OF THE INVENTION

The invention relates to a method of preparing an optical component for coupling with an optical fiber. The method includes determining a thickness of a buffer layer formed on the optical component. The method also includes forming an anti reflective coating adjacent to the buffer layer. The anti reflective coating is formed to a thickness selected in response to the determined buffer layer thickness.

Another embodiment of the method includes determining a thickness of an anti reflective coating formed on the optical component. The method also includes forming a buffer layer adjacent to the anti reflective coating. The buffer layer is formed to a thickness selected in response to the determined thickness of the anti reflective coating.

In some instances, the coefficient of thermal expansion of the buffer layer and the coefficient of thermal expansion of the anti reflective coating have opposing signs. In one embodiment, the buffer layer is formed so as to expand with increasing temperature and the anti reflective layer is formed so as to contract with increasing temperature.

The invention also relates to an optical component system. The optical component system has a waveguide with a waveguide facet. A buffer layer is positioned between the waveguide facet and the optical fiber. The buffer layer does not include SiO$_2$. An anti reflective layer is positioned between the waveguide facet and the optical fiber.

In another embodiment of the optical component system, an optical fiber is coupled with an optical component, the optical component having a waveguide with a waveguide facet. A buffer layer is positioned between the waveguide facet and the optical fiber. The buffer layer has a thickness greater than 5 nm. The optical component system also includes an anti reflective layer positioned between the waveguide facet and the optical fiber.

The invention also relates to a plurality of optical component assemblies. The optical component assemblies include a plurality of optical components that are each coupled with one or more optical fibers. A buffer layer is positioned between the optical fibers and the optical components. At least a portion of the buffer layers have substantially different thickness. An anti reflective layer is positioned between the optical fibers and the optical components. The anti reflective coatings on optical components with different buffer layer thickness have a different thicknesses.

BRIEF DESCRIPTION OF THE FIGURES

FIG. 3 is a graphic including a curve showing combinations of buffer layer thickness and reflective coating thickness that are associated with a constant level of reflectance.

DETAILED DESCRIPTION OF THE PREFERRED EMBODIMENT

The invention relates to coupling of an optical fiber with an optical component. The optical component includes a waveguide. A buffer layer is formed on the waveguide and the thickness of the buffer layer determined. An anti reflective layer is formed adjacent to the buffer layer. The anti reflective layer is formed to a thickness selected in response to the determined buffer layer thickness. In some instances, the thickness of the anti reflective layer is selected so as to reduce or minimize the amount of reflection at the intersection of the waveguide and the optical fiber.

The anti reflective layer and the buffer layer can have coefficients of thermal expansion with opposing signs. The coefficient of thermal expansion is a measure of the rate at which a material expands or contracts as the temperature changes. The opposing signs means that the buffer layer contracts as the anti reflective coating expands or that the buffer layer expands as the anti reflective coating contracts. As a result, the response of the buffer layer to changes in temperature balances the forces that the anti reflective layer applies to the waveguide in response to temperature changes. Because the action of the buffer layer balances the forces of the anti reflective layer on the waveguide, the stress that the anti reflective layer applies to the waveguide is reduced.

In some instances, the buffer layer is selected such that the anti reflective coating adheres to the buffer layer better than is does to the material of the waveguide. As a result, the buffer layer can provide can improve the adherence between the waveguide and the optical fiber.

Figure 1A:
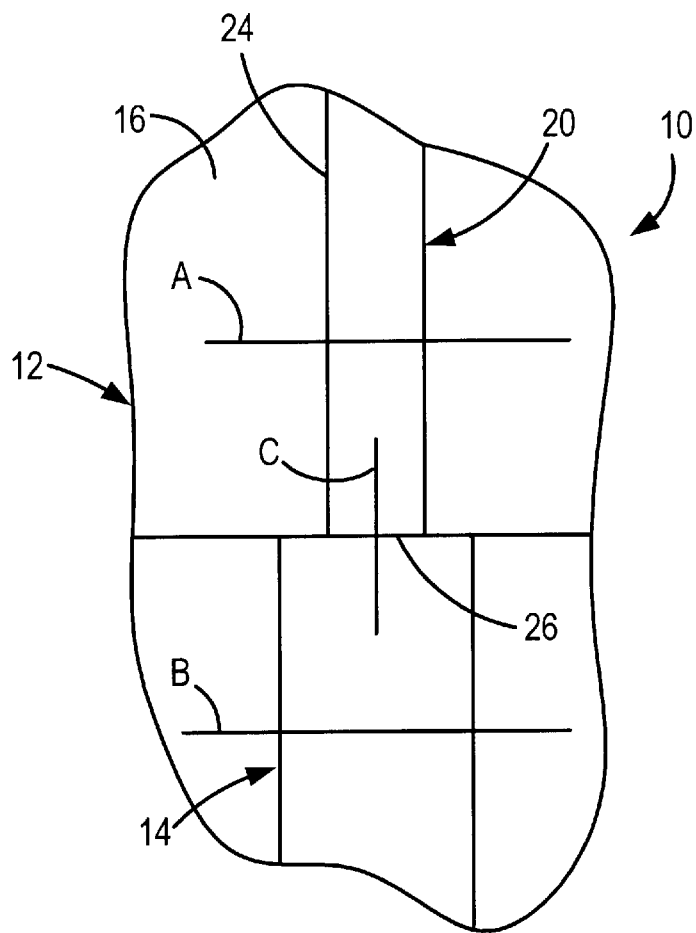
FIG. 1A is a topview of a portion of an optical component system. The optical component system includes an optical component bonded to an optical fiber.
Figure 1B:
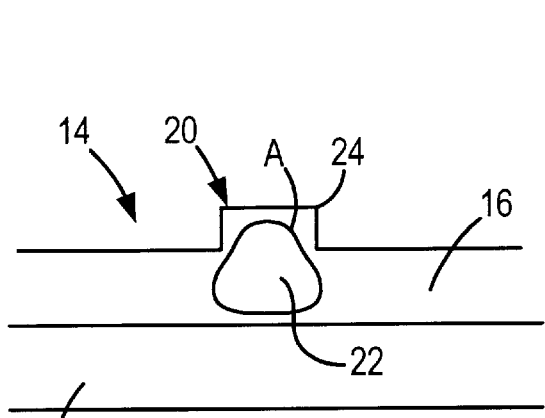
FIG. 1B is a cross section of the component taken at the line labeled A in FIG. 1A.
Figure 1C:
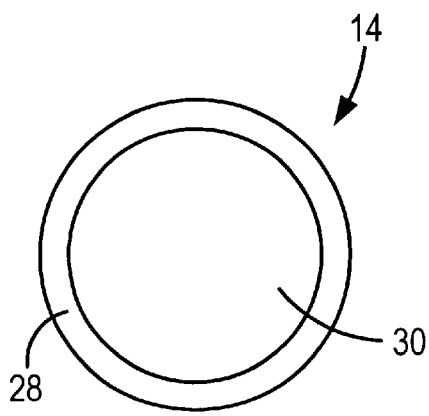
FIG. 1C is a cross section of the optical fiber taken at the line labeled B in FIG. 1A.
Figure 1D:
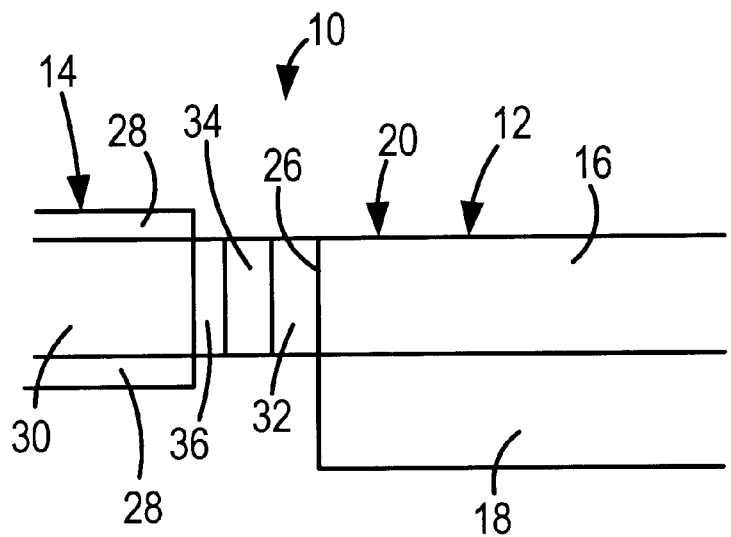
FIG. 1D is a cross section of the optical component system taken at the line labeled C in FIG. 1A.

FIG. 1A is a topview of a portion of an optical component system 10. The optical component system 10 includes an optical component 12 bonded to an optical fiber 14. FIG. 1B is a cross section of the component 12 taken at the line labeled A in FIG. 1A. FIG. 1C is a cross section of the optical fiber 14 taken at the line labeled B in FIG. 1A. FIG. 1D is a cross section of the optical component system 10 taken at the line labeled C in FIG. 1A.

The optical component 12 includes a light transmitting medium 16 positioned over a base 18. A suitable light transmitting medium 16 includes, but is not limited to, silicon. A waveguide 20 having a light signal carrying region 22 is defined in the light transmitting medium 16. A ridge 24 defines a portion of the light signal carrying region 22. The portion of the base 18 under the ridge 24 includes a material that reflects light signals from the light signal carrying region 22 back into the light signal carrying region 22. As a result, the base 18 also defines a portion of the light signal carrying region 22. The profile of a light signal carried in the light signal carrying region 22 is illustrated by the line labeled A. The waveguide 20 ends at a waveguide facet 26 through which light signals enter and/or exit from the optical component 12.

The optical fiber 14 includes a cladding layer 28 surrounding a core 30. The optical signals are carried in the core 30 of the optical fiber 14. The core 30 ends at a fiber facet through which light signals enter and/or exit the optical fiber 14. Although the optical fiber 14 is illustrated as having a cladding layer 28, the optical component 12 can be coupled with optical fibers 14 that do not include the cladding layer 28. FIG. 1C illustrates the core 30 as having a diameter matched to the thickness of the light signal carrying region 22. However, the core 30 can have a diameter not is not matched to either the thickness of the light signal carrying region 22 or the width of the light signal carrying region 22. In some instances, the diameter of the core 30 is smaller than the thickness of the light signal carrying region 22 and/or smaller than the width of the ridge 24.

A buffer layer 32, an anti reflective coating 34 and an index matching medium 36 are positioned between the optical component 12 and the optical fiber 14. A suitable buffer layer 32 includes, but is not limited to, silica, SiON with nitride composition>3%, and transparent films with compressive stress natures. A suitable anti reflective coating 34 includes, but is not limited to, silicon rich oxide ($SiO_x$ where x is generally in the range from 1 to 2), silicon rich nitride ($SiN_x$ where x is generally in the range from 1 to 2), $TiO_x$ where x is generally in the range from 1 to 2 or $Ta_2O_5$. A suitable index matching medium 36 include, but are not limited to, an index matching oil or an index matching epoxy.

Figure 1E:
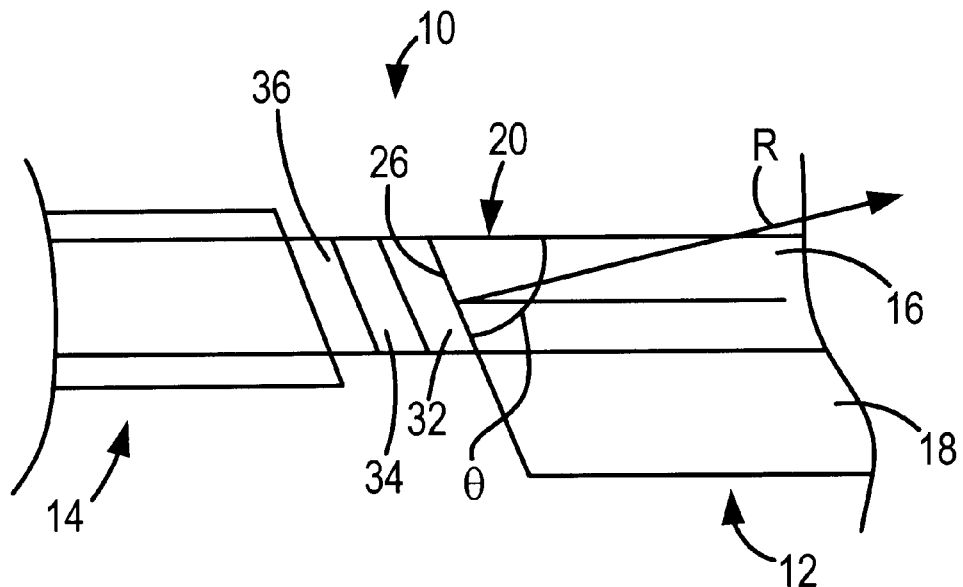
FIG. 1E is a cross section of an optical component system taken at the line labeled C in FIG. 1A. The optical component has a waveguide with a facet that is angled at less than ninety degrees relative to a direction of propagation of light signal traveling along the waveguide.

FIG. 1E illustrates another embodiment of a cross section of the optical component system 10 taken at the line labeled C in FIG. 1A. The waveguide facet 26 is angled at less than ninety degrees relative to the direction of propagation of light signals along the waveguide as shown by the angle labeled θ. The angle can cause reflected light signals reflected by the waveguide facet 26 to be reflected out of the waveguide or out of the optical fiber as illustrated by the arrow labeled R. Reflecting the light signal out of the waveguide or optical fiber prevents the light signal from acting as source of resonance or from damaging other components. Suitable angles, θ, include, but are not limited to, 65 degree to 89 degrees, 81 degrees to 88 degrees, 82 degrees to 87 degrees and 83 degrees to 86 degrees. The optical fiber has a facet angled such that coupling the optical fiber and the waveguide facet result in a substantially straight path for the light signals entering or exiting the optical component through the waveguide facet.

The angle waveguide facet on the optical component system of FIG. 1E can be formed by polishing and/or buffering the waveguide facet of the optical component shown in FIG. 1D before formation of the buffer layer 32, an anti reflective coating 34. The waveguide facet is buffered and/or polished to the desired angle, θ.

When the light transmitting medium 16 is silicon, the buffer layer 32 is silica and the anti reflective coating 34 is $SiN_x$, the adhesion of the optical component system 10 is improved. $SiN_x$ adheres to silica better than to silicon and silica adheres better to silicon than does $SiN_x$. As a result, placing a silica buffer layer 32 between silicon and $SiN_x$ improves the adhesion between $SiN_x$ and silicon.

In some instances, the anti reflective coating and the buffer layer have coefficients of thermal expansion with opposite signs. More specifically, when the coefficient of thermal expansion for the buffer layer 32 is positive, the anti reflective coating 34 has a negative coefficient of thermal expansion. Alternatively, when the coefficient of thermal expansion for the buffer layer 32 is negative, the anti reflective coating 34 has negative coefficient of thermal expansion.

A positive coefficient of thermal expansion means that the material is expansive in that the material expands as the temperature increases while a negative coefficient of thermal expansion means that the material is compressive in that the material contracts as the temperature increases. The expansive or compressive forces that the anti reflective layer would normally place on the waveguide 20 are placed on the buffer layer 32. The buffer layer 32 does not transfer these forces to the waveguide 20 because the buffer layer 32 acts in the opposite direction. Hence, the buffer layer 32 effectively reduces the stress that the waveguide 20 causes on the optical component 12.

The optical component system 10 can be constructed by forming the buffer layer 32 on the component 12. Forming the buffer layer 32 on the component 12 can include forming the buffer layer 32 over the light transmitting medium 16. Suitable means for forming the buffer layer 32 over the light transmitting medium 16 include, but are not limited to, evaporation, chemical vapor deposition (CVD) and sputtering. Alternatively, forming the buffer layer 32 can include converting a portion of the light transmitting medium 16 to buffer layer 32. For instance, when the light transmitting medium 16 is silicon and the buffer layer 32 is silica, a thermal oxide treatment can be performed on the light transmitting medium 16 to convert the silicon to silica. Alternatively, the silicon can be exposed to oxygen at room temperature and pressure for a period of time that converts the silicon to silica. Exposing silicon to oxygen at room temperature typically does not provide a layer of silica greater than 5 nm while a thermal oxidation treatment can provide a thicker buffer layer 32.

In some instances, the buffer layer 32 is formed to a thickness of about 3 to 50 nm, 3 to 30 nm, 3 to 20 nm or 3 to 10 nm. The buffer layer 32 can be formed to a thickness of between 6 to 50 nm, 6 to 30 nm, 6 to 20 nm or 6 to 10 nm. In some instances, the buffer layer 32 is formed to a thickness of greater than 5 nm, greater than 6 nm, greater than 7 nm or greater than 10 nm.

The anti reflective coating 34 is formed adjacent to the buffer layer 32. Suitable means for forming the anti reflective coating 34 include, but are not limited to, sputtering, e-beam evaporation, plasma enhanced chemical vapor deposition (PECVD) and low pressure chemical vapor deposition (LPCVD).

The epoxy matching medium 36 is positioned on the optical component 12 or on the optical fiber 14 and the optical fiber 14 coupled with the optical component 12.

In some instances, the thickness of the buffer layer 32 is determined and the anti reflective coating 34 is formed to a thickness selected in response to the determined thickness of the anti reflective coating 34. The thickness of the buffer layer 32 can be determined using instruments such as an ellipsometer.

The thickness of the buffer layer 32 can be determined by monitoring formation of the buffer layer 32. For instance, when the buffer layer 32 is formed with a thermal oxide treatment, the conditions of the thermal oxide treatment can be controlled to provide a buffer layer 32 of a particular thickness. The anti reflective coating 34 can be formed soon enough after formation of the buffer layer 32 that the buffer layer 32 does not decay or harmful additional amounts of the buffer layer 32 do not form. Alternatively, the component 12 can be stored under conditions that prevent formation of undesired amounts of buffer layer 32 until the anti reflective coating 34 can be formed. When the light transmitting medium 16 is silicon and the buffer layer 32 is formed by exposing the silicon to oxygen, the period of time that the component 12 has been exposed to oxygen can be measured to determining the thickness of the buffer layer 32. For instance, a relationship between the period of time that the light transmitting medium 16 is exposed to oxygen and the thickness of the buffer layer 32 can be used in conjunction with the measured period of time in order to approximate the thickness of the buffer layer 32.

Figure 2:
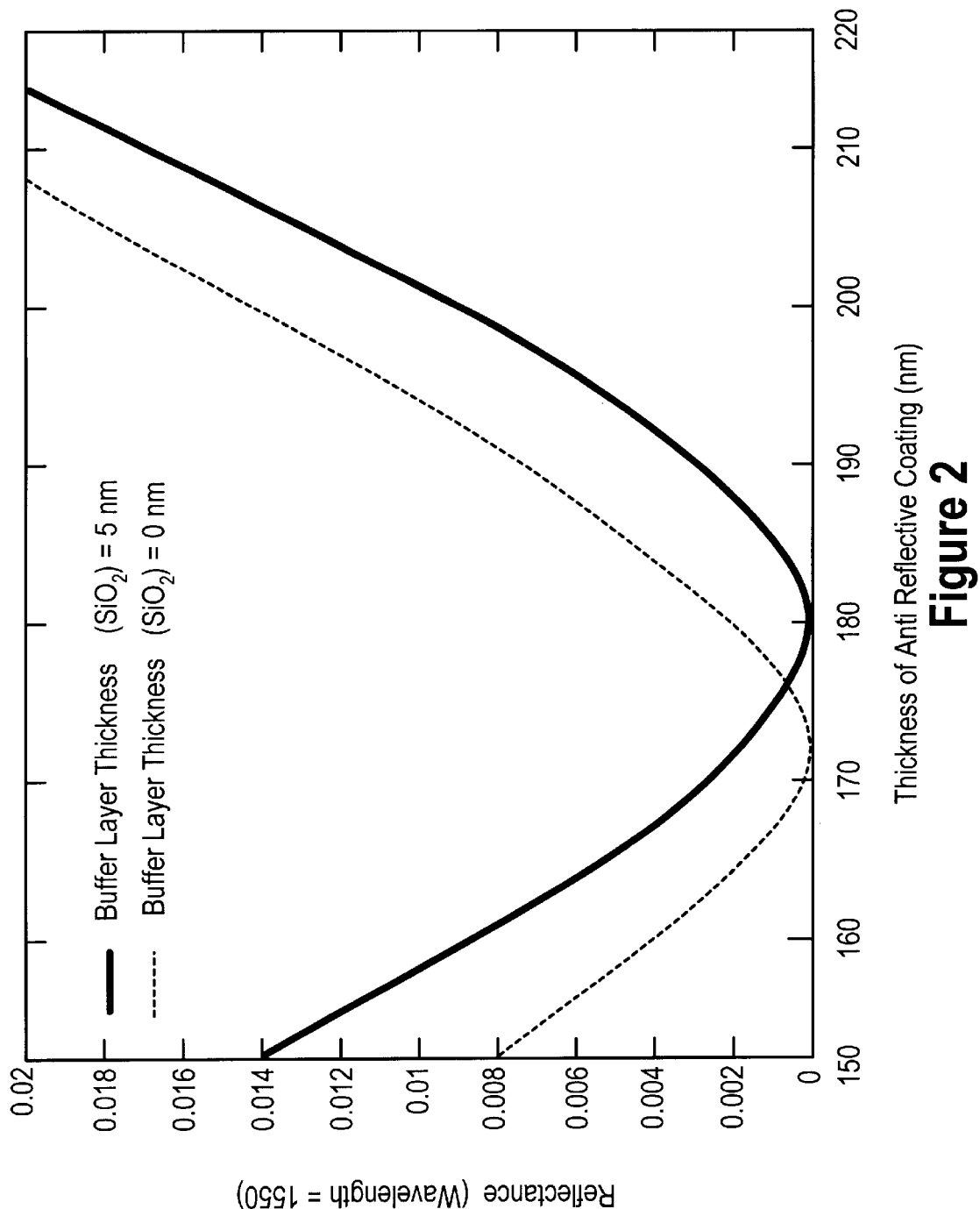
FIG. 2 is a graphic illustrating reflectance as a function of the anti reflective coating thickness.

FIG. 2 illustrates the amount of reflectance as a function of the anti reflective coating 34 thickness. The illustrated reflectance is for light with a wavelength of 1550 nm. There are two curves illustrated. One curve is for a buffer layer 32 thickness of 0 nm and the other is for a buffer layer 32 thickness of 5 nm. The curves are generated with silicon as the light transmitting medium 16, silica as the buffer layer 32 and $SiN_x$ as the anti reflective coating 34. The location where the minimum amount of reflectance occurs moves as the thickness of the buffer layer 32 changes. In order to couple the optical fiber 14 to the optical component 12 with the minimum amount of reflection, the thickness of the anti reflective coating 34 must be selected in response to the thickness of the buffer layer 32. For instance, when the buffer layer 32 is not present, an anti reflective coating 34 thickness of about 172 nm provides the minimum amount of reflectance. However, when the buffer layer 32 is about 0.05 nm thick, an anti reflective coating 34 thickness of about 180 nm provides the minimum amount of reflectance.

FIG. 3 is a graphic that can be used to select the thickness of the anti reflective layer in response to the determined thickness of the buffer layer 32. The y axis is the buffer layer 32 thickness and the x axis is the anti reflective coating 34 thickness. The graphic includes a plurality of curves generated using silicon as the light transmitting medium 16, silica as the buffer layer 32 and $SiN_x$ as the anti reflective coating 34. Each curve shows the various combinations of buffer layer 32 thickness and anti reflective coating 34 thickness that produce a particular reflectance of 1550 nm light. For instance, the curve labeled A shows the combinations of buffer layer 32 thickness and anti reflective coating 34 thickness that produce a reflectance of about 0.005. As a result, when a reflectance of 0.005 is desired, any combination of buffer layer 32 thickness and anti reflective coating 34 thickness along the curve labeled A will provide the desired reflectance. Hence, when the buffer layer 32 is determined to have a thickness of 10 nm and a reflectance of 0.005 is desired, FIG. 3 illustrates that forming the anti reflective coating 34 to a thickness of 170 nm provides the desired reflectance.

The graph can also be used to determine an acceptable range of thickness for the anti reflective coating 34. Each level of reflectance in FIG. 3 is associated with two curves. For instance, the curve labeled A and the curve labeled B are each associated with a reflectance of 0.005. The area between the curve labeled A and the curve labeled B is associated with reflectance less than 0.005. As a result, when any reflectance less than 0.005 is acceptable, any combination of buffer layer 32 thickness and anti reflective coating 34 thickness associated with a point between the curve labeled A and the curve labeled B will provide any acceptable reflectance.

Figure 1F:
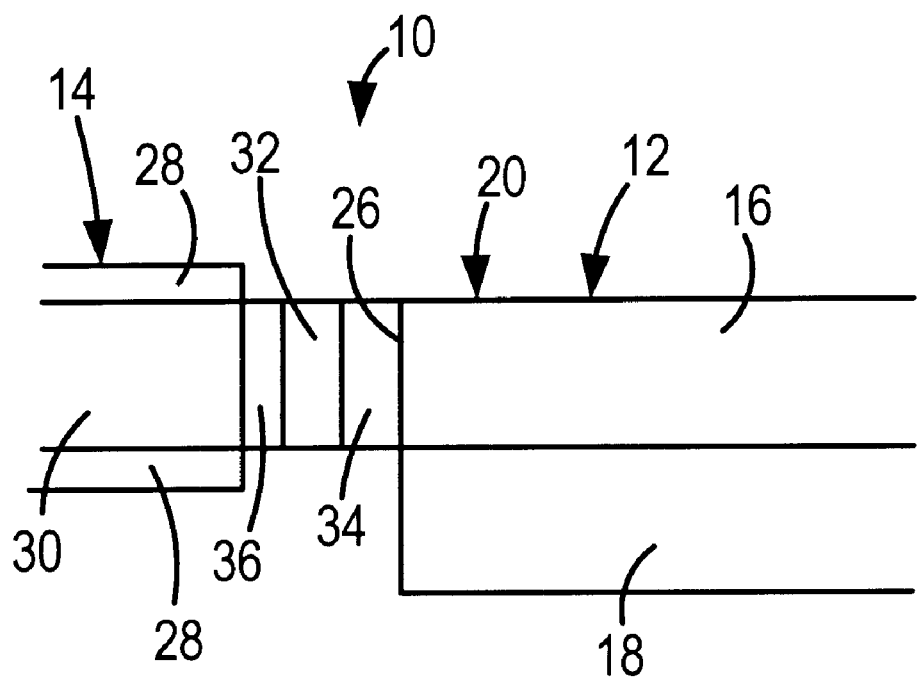
FIG. 1F is another example of a cross section of an optical component system.

Although the above discussion and illustrations are disclosed in the context of the buffer layer 32 being positioned between the waveguide 20 and the anti reflective coating 34, the anti reflective coating 34 can be positioned between the waveguide 20 and the buffer layer 32 as shown in FIG. 1F. Additionally, the location of the index matching medium 36 relative to the buffer layer 32 and the anti reflective coating 34 can also be varied. However, these arrangements can result in a reduction of the benefits. For instance, placing the anti reflective coating 34 in contact with the waveguide 20 can increase the stress on the waveguide 20 above a desirable level despite any stress reduction caused by the action of the buffer layer 32.

When the anti reflective coating 34 is positioned between the waveguide 20 and the buffer layer 32, the thickness of the anti reflective coating 34 can be determined. The buffer layer 32 is then formed to a thickness selected in response to the determined thickness of the anti reflective coating 34. FIG. 3 can be used to select the thickness of the buffer layer 32 so as to provide a desired level of reflectance.

The above invention allows flexibility with respect to fabrication of the optical component systems 10. For instance, a buffer layer 32 can be formed on a plurality of optical components 12. The buffer layers 32 formed on different optical components 12 can have substantially different thickness. Substantially different thickness of the buffer layer 32 is a difference in thickness that exceeds that variation in thickness that results from the method employed to form the buffer layer 32. The anti reflective layer formed on each component 12 can have a thickness selected in response to the thickness of the buffer layer 32. As a result, the anti reflective coatings 34 on optical components 12 with substantially different buffer layer 32 thickness can have substantially different thickness. Substantially different thickness of the anti reflective coating 34 is a difference in thickness that exceeds that variation in thickness that results from the method employed to form the anti reflective coating 34.

Although the above discussion discloses an optical component 12 having a single waveguide ending at a waveguide facet 26, an optical component 12 can include a plurality of waveguide facets 26. For instance, the optical component 12 can include one or more waveguides 20 that each includes two waveguide facets 26. Alternatively, the optical component 12 can include a plurality of waveguides 20 that each end in one or more waveguide facets 26. An optical fiber 14 can be coupled with all or a portion of the waveguide facets 26. Additionally, all or a portion of the waveguide facets 26 can be positioned adjacent to a buffer layer 32 and an anti reflective coating 34.

Although the above discussion discloses the waveguide facet 26 as being flush with the edge of the component 12, the principles of the present invention are easily applied to components 12 including V grooves for aligning an optical fiber 14 with a waveguide facet 26. Additionally, the principles of the present invention can be used in conjunction with waveguides 20 other than ridge 24 waveguides 20. For instance, the principles of the present invention can be applied to slab waveguides, buried channel waveguides, strip waveguides and rectangular waveguides.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of preparing an optical component, comprising:
    determining a thickness of a buffer layer formed on a facet of the optical component; and
    forming an anti reflective coating on the buffer layer such that the buffer layer is between the facet and the anti reflective coating, the anti reflective coating formed to a thickness selected in response to the determined buffer layer thickness.
2. The method of claim 1, wherein the buffer layer includes silica.
3. The method of claim 1, wherein the buffer layer includes SiON with nitride composition >3%.
4. The method of claim 1, wherein the buffer layer includes a transparent film with a compressive stress nature.
5. The method of claim 1, wherein the anti reflective coating is selected from a group consisting of silicon rich nitride, silicon rich oxide, $TiO_2$ and $Ta_2O_5$.
6. The method of claim 1, further comprising:
    bonding the optical fiber to the anti reflective coating.
7. The method of claim 1, wherein bonding the optical fiber to the anti reflective coating includes positioning an index matching medium between the anti reflective coating and the optical fiber.
8. The method of claim 1, wherein the anti reflective coating is formed to a thickness of between 160 nm and 190 nm.
9. The method of claim 1, wherein the anti reflective coating is formed to a thickness of between 170 nm and 190 nm.
10. The method of claim 1, wherein the anti reflective coating is formed to a thickness of between 175 nm and 185 nm.
11. The method of claim 1, wherein the thickness of the anti reflective coating is selected so as to achieve the minimum amount of reflection.
12. The method of claim 1, further comprising:
    forming the buffer layer on the optical component.
13. The method of claim 12, wherein forming the buffer layer includes performing a thermal oxide treatment on the optical component.
14. The method of claim 13, wherein the buffer layer is formed to a thickness of 5 nm to 50 nm.
15. The method of claim 12, wherein the component includes a waveguide facet and the buffer layer is formed of the waveguide facet.
16. The method of claim 12, where the buffer layer and the ant reflective coatings are formed so as to have coefficients of thermal expansion with opposite signs.
17. The method of claim 12, where the buffer layer is formed so as to expand with increasing temperature and the anti reflective layer is formed so as to contract with increasing temperature.
18. A method of preparing an optical component, comprising:
    determining a thickness of an anti reflective coating formed on a facet of the optical component; and
    forming a buffer layer on the anti reflective coating such that the anti reflective coating is between the facet and the buffer layer, the buffer layer formed to a thickness selected in response to the determined thickness of the anti reflective coating.
19. An optical component system, comprising:
    an optical fiber coupled with an optical component, the optical component having a waveguide with a waveguide face;
    a buffer layer positioned between the waveguide facet and the optical fiber, the buffer layer having a thickness greater the 5 nm; and
    an anti reflective layer between the waveguide facet and the optical fiber.
20. The system of claim 19, wherein the buffer layer has a thickness of 6 nm to 50 nm.
21. The system of claim 19, wherein the buffer layer has a thickness of 7 nm to 50 nm.
22. The system of claim 19, wherein the anti reflective layer has a thickness that provides a minimum in a curve of the reflectance versus thickness of the anti reflective coating, the curve being associated with the thickness of the buffer layer.
23. The system of claim 19, wherein a coefficient of thermal expansion of the buffer layer has a sign that is opposite to a coefficient of thermal expansion of the anti reflective layer.
24. The system of claim 19, further comprising:
    an index matching medium positioned between the waveguide facet and the optical fiber.
25. The system of claim 19, wherein the buffer layer is positioned between the anti reflective layer and the waveguide facet.
26. An optical component system, comprising:
    an optical fiber coupled with an optical component, the optical component having a waveguide with a waveguide facet;
    a buffer layer positioned between the waveguide facet and the optical fiber, the buffer layer excluding $SiO_2$; and
    an anti reflective layer between the waveguide facet and the optical fiber.
27. The system of claim 26, wherein a coefficient of thermal of the buffer layer has a sign that is opposite to a coefficient of thermal expansion of the anti reflective layer.
28. The system of claim 26, further comprising:
    an index matching medium positioned between the waveguide facet and the optical fiber.
29. A plurality of optical component assemblies, comprising:
    a plurality of optical components that are each coupled with one or more optical fibers;

a buffer layer positioned between the optical fibers and the optical components, at least a portion of the buffer layers having substantially different thickness; and an anti reflective layer positioned between the optical fibers and the optical components, the anti reflective coatings on optical components with different buffer layer thickness having a different thickness.

30. An optical component, comprising:

an optical component having a waveguide with a waveguide facet;

a buffer layer positioned on the waveguide facet; and an anti reflective coating positioned on the buffer layer such that the buffer layer is between the facet and the anti reflective coating.

31. The component of claim 30, wherein the buffer layer has a thickness greater than 5 nm.

32. The component of claim 30, wherein the buffer layer thickness is 6 nm to 50 nm.

33. The component of claim 30, wherein the buffer layer thickness is 7 nm to 50 nm.

34. The component of claim 30, wherein the buffer layer excludes $SiO_2$.

35. The component of claim 30, wherein the anti reflective layer has a thickness that provides a minimum in a curve of the reflectance versus thickness of the anti reflective coating, the curve being associated with the thickness of the buffer layer.

36. The component of claim 30, wherein a coefficient of thermal expansion of the buffer layer has a sign that is opposite to a coefficient of thermal expansion of the anti reflective layer.

37. The component of claim 30, further comprising:

an index matching medium on the anti reflective coating.

* * * * *